United States Patent [19]

Trowell

[11] Patent Number: 4,758,602

[45] Date of Patent: Jul. 19, 1988

[54] POLYOLS FROM TALL OIL AND AROMATIC POLYESTER POLYOLS

[75] Inventor: John M. Trowell, St. Simons Island, Ga.

[73] Assignee: Hercules Incorporated, Wilmington, Del.

[21] Appl. No.: 105,624

[22] Filed: Oct. 5, 1987

[51] Int. Cl.[4] .............................................. C08G 18/14
[52] U.S. Cl. ................................. 521/109.1; 521/157; 528/74.5; 528/279; 528/295.5; 428/308.4; 428/423.1
[58] Field of Search ............................ 521/109.1, 157; 528/74.5, 279, 295.5; 428/423.1, 308.4

[56] References Cited

U.S. PATENT DOCUMENTS

| | | | |
|---|---|---|---|
| 3,095,386 | 6/1963 | Hudson | 260/2.5 |
| 4,225,453 | 9/1980 | DePaul et al. | 252/182 |
| 4,608,432 | 8/1986 | Magnus et al. | 528/274 |
| 4,609,513 | 9/1986 | Israel | 264/122 |
| 4,644,048 | 2/1987 | Magnus et al. | 528/295.5 |

Primary Examiner—Maurice J. Welsh
Attorney, Agent, or Firm—Joanne W. Patterson

[57] ABSTRACT

Disclosed are polyester polyols prepared by esterifying tall oil with an excess of aromatic polyester polyols. The polyester polyols that are produced by this process are compatible with a trichlorofluoromethane blowing agent and are suitable for use in the manufacture of polyurethane and urethane-modified polyisocyanurate foams.

18 Claims, No Drawings

POLYOLS FROM TALL OIL AND AROMATIC POLYESTER POLYOLS

FIELD OF INVENTION

This invention relates to polyester polyols that are compatible with a trichlorofluoromethane blowing agent and are suitable for use in the manufacture of rigid polyurethane (PUR) and urethane-modified polyisocyanurate (PUR/PIR) foams. This invention particularly relates to polyester polyols prepared by esterifying tall oil with an excess of aromatic polyester polyols.

BACKGROUND OF THE INVENTION

A problem that is consistently encountered with the use of aromatic polyester polyols in the manufacture of rigid polyurethane and urethane-modified polyisocyanurate foams is compatibility with the trichlorofluoromethane blowing agent commonly used in foam formulations. The two methods commonly used to overcome this problem are (1) incorporation of polypropylene glycol into the polyol molecular structure, either by propoxylation or addition of dipropylene glycol, and (2) the addition of a compatible polyether polyol or a compatibilizer such as an alkyl phenol ethoxylate. Although both methods work with varying degrees of success with some aromatic polyester polyols, neither is completely successful when the polyols are derived from dimethyl terephthalate (DMT) process residue.

If dipropylene glycol is incorporated into the molecular structure of an aromatic polyester polyol derived from DMT process residue, the final product viscosity is too high for convenient processing of the product. To achieve a viscosity of less than 20,000 cps at 25° C, the amount of free glycol remaining in the product has to be increased, thus increasing the product hydroxyl number, i.e., reducing the equivalent weight. The current emphasis in the rigid foam market is on higher isocyanate to hydroxyl ratios. Low equivalent weight polyols are therefore not desirable, since the amount of isocyanate needed to achieve the required ratio, and therefore the cost, would have to be increased. In addition, producers of rigid foam products have increased the level of aromatic polyester polyols in their formulations. Because of this increase in the aromatic content of rigid foams, polyester polyols derived from DMT process residue, which are highly viscous and difficult to process, are unsuitable for use in these formulations.

SUMMARY OF THE INVENTION

It has now been found that esterification of tall oil with aromatic polyester polyols produces a polyester polyol product that is compatible with a trichlorofluoromethane blowing agent and has a viscosity that is acceptable for use in the manufacture of rigid foams.

The mixture of polyester polyols of this invention is prepared by reacting (a) tall oil and (b) aromatic polyester polyols, in the presence of an esterification/transesterification catalyst, while continuously removing the water that is formed during the esterification reaction, the ratio of tall oil to aromatic polyester polyols being from about 0.9:1 to about 0.2:1, and the catalyst being present in an amount of at least 1.7 grams per kilogram of the total charge.

DETAILED DESCRIPTION OF THE INVENTION

The polyester polyols of this invention are produced by esterifying tall oil with an excess of aromatic polyester polyols. The reaction is carried out at a temperature of 180°–235° C. in the presence of an esterification/transesterification catalyst. The water that is formed during the esterification reaction is continuously removed overhead. The reaction is considered complete when the residual acid number of the product is about 6 or less, which typically occurs after a reaction time of about 5 hours.

The aromatic polyester polyols that are esterified with tall oil in the process of this invention contain at least two hydroxyl groups. They are prepared by esterifying an aromatic polycarboxylic acid-containing material with a polyhydric alcohol, typically diethylene glycol. The aromatic carboxylic acid-containing material can be, for example, depolymerized scrap polyethylene terephthalate, e.g., from fiber, bottles or film; phthalic acid or phthalic anhydride; or dimethyl terephthalate process residue. Such aromatic polyester polyols are available commercially. Examples include TERATE® 203 aromatic polyester polyol (Hercules Incorporated), CHARDOL™ 570 aromatic polyester polyol (Chardonol Corp.) and STEPANOL™ PS-3152 polyester polyol (Stepan Chemical Co.).

The aromatic polyester polyols that are derived from DMT process residue are prepared by reacting the process residue with an excess of a glycol or mixture of glycols such as, for example, ethylene glycol; 1,2- or 1,3-propanediol; 1,3- or 1,4-butanediol; neopentyl glycol; hexanediol; diethylene glycol and dipropylene glycol. The preparation of such a product is described in U.S. Pat. No. 4,346,229, the disclosure of which is incorporated herein by reference. Aromatic polyester polyols that are the reaction product of DMT process residue and diethylene glycol are preferred.

The residue from the manufacture of dimethyl terephthalate is a tar-like, solid material composed of a highly complex mixture of high molecular weight monomeric and polymeric constituents, included among which are the methyl and benzyl esters of biphenyl and triphenyl dicarboxylic and tricarboxylic acids. The residue at 25° C. has the following typical ranges of properties:

| | |
|---|---|
| Color | Dark Brown |
| Drop Softening Point[1] | 10–140° C. |
| Acid Number (ASTM D1639, neutral chloroform solvent) | 10–110 |
| Methoxyl in COOCH$_3$ (ASTM D-1166-60) | 7–30% by weight |
| DMT | 0–20% by weight |
| Saponification Number[2] | 375–500 |

[1]Hercules drop softening point method as described on page 12 of a booklet entitled "Wood Rosins, Modified Rosins and Related Resins", published in 1963 by Hercules Powder Company now by change of name Hercules Incorporated.
[2]Anal. Chem. 23, 1126 (1951).

The term "tall oil" as used in this specification refers to a mixture of rosin acids, fatty acids and other materials obtained by acid treatment of the alkaline liquors from the digesting (pulping) of pine wood. Any tall oil containing from about 60% to about 98% fatty acids and from about 0.6% to about 30% rosin acids is suitable for use in the process of this invention.

Polyester polyols that are compatible with a trichlorofluoromethane blowing agent and are satisfactory for use in polyurethane and urethane-modified polyisocyanurate foam formulations are obtained at a charge ratio of tall oil to aromatic polyester polyols of from about 0.9:1 to about 0.2:1. A ratio of from about 0.25:1 to about 0.3:1 is preferred. In this specification the term "urethane-modified polyisocyanurate foams" refers to foams prepared from polymers containing both urethane linkages and isocyanurate rings.

Any catalyst suitable for esterification or transesterification reactions can be used in the process of this invention. Such catalysts are well known in the art and include, but are not limited to, tetraisopropyl titanate, zinc oxide and calcium, manganese, zinc and tin salts of acetic acid. Tetraisopropyl titanate is preferred. A minimum level of 1.7 grams per kilogram of total charge is required. The upper limit is controlled by the economics of the process and by the amount of residual catalyst from the manufacture of the aromatic polyester polyol.

The process is typically carried out at a temperature of from about 180° C. to about 235° C. and at atmospheric pressure. However, it will be apparent to one skilled in the art that pressures higher or lower than atmospheric can be use. At higher pressures the reaction temperature can be increased significantly, thus shortening the reaction time. Operating at reduced pressure aids in removal of the water that is formed during the esterification reaction.

For use in PUR and PUR/PIR foam formulations, the polyester polyols of this invention preferably have a hydroxyl number of 90-350 and a viscosity of 1,000-18,000 cps at 25° C. Any desired hydroxyl number within this range can be obtained by adjusting the amount of free glycol in the reaction mixture. Particularly desirable products have a hydroxyl number of 150-210 and a viscosity of 1500-18,000 cps at 25° C., or a hydroxyl number of 270-350 and a viscosity of 1000-3000 cps at 25° C.

The polyester polyols of this invention are compatible with trichlorofluoromethane, a conventional blowing agent used in the production of closed-cell rigid foams and sold under the trademark FREON ® 11 (Du Pont). The polyester polyol is considered to be 100% compatible with the trichlorofluoromethane blowing agent at a solubility of 30% by weight FREON in the polyol. The neat polyester polyols of this invention have a FREON solubility of 30% or higher. The FREON solubility is about 16% for aromatic polyester polyols derived from DMT process residue that have not been esterified with tall oil fatty acids as in the process of this invention.

The polyester polyols prepared by the process of this invention can be used in foam-forming formulations for the manufacture of rigid foams. These foams have the dimensional stability and compressive strength required for the manufacture of PUR/PIR laminate foam board and both PUR and PUR/PIR "pour-in-place" applications. The laminated boards are used as building panels and can comprise a single facing sheet having the foam thereon, or a facing sheet on either side of the foam. Any facing sheet material employed to produce building panels can be used. Examples of suitable facing sheet materials include, among others, kraft paper, aluminum, fiber glass and asphalt-impregnated felts, as well as laminates of two or more of these materials. In "pour-in-place" applications the liquid foam-forming formulation is poured into a cavity where it foams, fills the cavity, and hardens and cures in place.

The following examples are illustrative of this invention and are not intended to limit its scope in any way. All parts and percentages in this specification are by weight unless otherwise noted.

EXAMPLE 1

TERATE ® 203 aromatic polyester polyol (Hercules Incorporated) (2,000 g), 562 g PAMAK ® 25A distilled tall oil (Hercules Incorporated), and 4.5 g tetraisopropyl titanate catalyst (TYZOR TPT, Du Pont) are charged to a five liter reactor equipped with an agitator, thermowell, nitrogen sparge tube and an overhead system to remove the water that is formed during the esterification reaction. TERATE ® 203 typically has a hydroxyl number of 320, an acid number of 2.9, a viscosity at 25° C. of 18,000 cps, and a maximum free diethylene glycol (DEG) content of 11%. PAMAK ® 25A typically contains 70.0% fatty acids, 27% resin acids and 3.0% unsaponifiables, and has a typical acid number of 189. The reactor is heated to 230°-235° C. under nitrogen and the overhead temperature is maintained at 100° C. maximum. When the overhead rate decreases and it is no longer possible to maintain an overhead temperature of 100° C., a sample is removed from the reactor for an acid number determination. When the acid number of the reactor contents is less than six, the reactor is cooled to 150° C. and the contents are transferred to a suitable storage container. The product has the following characteristics:

| | |
|---|---|
| Ratio PAMAK ® 25A to TERATE ® 203 | 0.281/1 |
| FREON Solubility, % | 30-35 |
| Hydroxyl Number | 200 |
| Acid Number | 5.2 |
| Viscosity, cps @ 25° C. | 14,500 |
| Water, % | 0.11 |
| DEG, % | 7.9 |

EXAMPLE 2

Polyester polyols are prepared as described in Example 1 at a charge ratio of PAMAK ® 25A distilled tall oil to TERATE ® 203 aromatic polyester polyol of 0.843:1 and a tetraisopropyl titanate catalyst charge of 3.5 grams per kilogram of total charge. The product has the following characteristics:

| | |
|---|---|
| FREON Solubility, % | 35+ |
| Hydroxyl Number | 90 |
| Acid Number | 8.8 |
| Viscosity, cps @ 25° | 4,400 |
| Water, % | 0.08 |
| DEG, % | 2.1 |

EXAMPLE 3

The reactor and operating conditions are the same as those used in Example 1. The reactor charge consists of the following: 3,000 g TERATE ® 203 aromatic polyester polyol (Hercules Incorporated), 592 g diethylene glycol (DEG), 927 g PAMAK ® 25A distilled tall oil (Hercules Incorporated) and 7.65 g tetraisopropyl titanate catalyst (TYZOR TPT, Du Pont). When the acid number is less than 4, the reactor contents are cooled to 150° C. and transferred to a suitable storage container. The product has the following characteristics:

| | |
|---|---|
| Ratio PAMAK ® 25A to TERATE ® 203 | 0.281/1 |
| FREON Solubility, % | 30-35 |
| Hydroxyl Number | 296 |
| Acid Number | 3.2 |
| Viscosity, cps @ 25° C. | 2,300 |
| Water, % | 0.12 |
| DEG, % | 16.1 |

EXAMPLE 4

A 3 liter reactor is charged with 1,506.6 g STEPANOL ™ PS-3152 aromatic polyester polyol (Stepan Chemical Company), 423.4 g PAMAK ® 25A distilled tall oil (Hercules Incorporated) and 6.8 g tetraisopropyl titanate catalyst (TYZOR TPT, Du Pont). The reactor is equipped with an agitator, thermowell, nitrogen sparge tube and an overhead system to remove the water that is formed during the esterification reaction. STEPANOL ™ PS-3152 typically has a hydroxyl number of 300-330, an acid number of 3.5 and a viscosity @25° C. of 2000-3000 cps. The reactor is heated under nitrogen until a maximum temperature of 235° C. is reached. When the acid number is 6 or less, approximately 5 ½ hours after the first overheads are collected, the reactor is cooled to 80° C. Total overheads collected are 30 ml or 31.7 g. The product has the following characteristics:

| | |
|---|---|
| Ratio PAMAK ® 25A to PS-3152 | 0.281 |
| FREON Solubility, % | 30 |
| Hydroxyl Number | 203 |
| Acid Number | 5.5 |
| Viscosity, cps @ 25° C. | 1,500 |
| Water, % | 0.05 |

EXAMPLE 5

The reactor and operating conditions are the same as in Example 4. A 3 liter reactor is charged with 2000 g CHARDOL ™ 570 polyester polyol (Chardonol Corp.), 562 g PAMAK ® 25A (Hercules Incorporated) and 9 g tetraisopropyl titanate catalyst (TYZOR TPT, Du Pont). CHARDOL ™ 570 typically has a hydroxyl number of 350±15, an acid number of 1.0 and a viscosity at 25° C. of 10,000±3,000. Total overheads collected are 50 ml or 45.4 g. The product has the following characteristics:

| | |
|---|---|
| Ratio PAMAK ® 25A to CHARDOL 570 | 0.281/1 |
| FREON Solubility, % | 30 |
| Hydroxyl Number | 225 |
| Acid Number | 4.2 |
| Viscosity, cps @ 25° C. | 4,200 |
| Water, % | 0.05 |

EXAMPLE 6

The formulations described in the Table are used to prepare PUR/PIR foams at the NCO/OH indices indicated. An index of 250 indicates a ratio of isocyanate equivalents to hydroxyl equivalents of 2.5 to 1. The foams prepared from these formulations are tested to determine their physical properties. In the preparation of the foams the "A" component contains the isocyanate. The "B" component contains the desired level of hydroxyl equivalents, as well as a surfactant, PUR/PIR catalysts and a blowing agent. After the "B" component is prepared, the isocyanate is weighed into the vessel containing the "B" component and the mixture is stirred for 5 seconds. The mixture is then poured into a mold where it reacts to form the foam. Details of the reaction cycle and the physical properties of the foam are given in the Table. In the formulations described below, all values are parts by weight.

TABLE

| Foam Formulation | | | | |
|---|---|---|---|---|
| NCO/OH Index | 250 | 250 | 350 | 350 |
| Polyol (Ex. 1) | 100 | — | 100 | — |
| Polyol (Ex. 3) | — | 100 | — | 100 |
| Surfactant (1) | 2.0 | 2.0 | 2.0 | 2.0 |
| Trimerization Catalyst (2) | 0.75 | 0.75 | 1.0 | 1.25 |
| Urethane Catalyst (3) | 3.0 | 3.0 | 4.0 | 5.0 |
| Blowing Agent (4) | 29 | 40 | 41 | 53 |
| Isocyanate (5) | 119.3 | 176.8 | 167.3 | 247.5 |
| Reaction Profile | | | | |
| Cream time (sec) | 12 | 13 | 12 | 13 |
| Gel time (sec) | 36 | 42 | 35 | 35 |
| Tack-free time (sec) | 42 | 56 | 67 | 55 |
| Rise time (sec) | 97 | 98 | 95 | 82 |
| Physical Properties | | | | |
| Density (lbs./ft.$^3$) | 2.01 | 1.90 | 1.78 | 1.80 |
| K Factor (initial) | 0.134 | 0.132 | 0.138 | 0.139 |
| Humid aging (70° C., 100% RH) % vol. change at | | | | |
| 1 Day | 4.3 | 5.2 | 3.8 | 3.5 |
| 7 Days | 7.3 | 8.4 | 6.5 | 6.4 |
| 14 Days | 8.1 | 10.2 | 6.8 | 7.3 |
| 28 Days | 8.5 | 11.0 | 7.8 | 7.3 |
| Compressive strength (psi) | 34.1 | 33.2 | 31.9 | 34.9 |
| Compressive modulus (psi) | 1050 | 926 | 884 | 895 |

(1) DC-193 silicone-polyoxyalkylene copolymer (Dow Corning)
(2) 75% Potassium 2-ethyl hexoate in diethylene glycol
(3) 2,4,6-Tris(dimethylaminomethyl)phenol
(4) Trichlorofluoromethane
(5) PAPI-27 polymethylene polyphenylisocyanate (Dow Chemical Company)

The terms used in the reaction profile and the list of physical properties are defined below.

Cream Time

Cream time or initiation time is the time interval between the mixing of the ingredients and the visible start of the foaming reaction. The reaction begins when the mixture turns a creamy color or when the foam just begins to rise.

Gel Time

Gel time is the time interval between the mixing of the ingredients and the time when the foamed polymer acquires a stable, three dimensional structure.

Tack Free Time

Tack free time is the time interval between the mixing of the ingredients and the time when the surface of the foam does not feel tacky to the hand or does not adhere to a wooden tongue depressor.

Rise Time

Rise time is the interval between the mixing of the ingredients and the time when the foam stops rising in an open container.

Density (ASTM D 1622)

A 4-inch×4-inch×1-inch specimen is cut from a foam bun. The test specimen is measured and then weighed to the nearest 0.01 gram. Density in pounds per cubic foot is then calculated using the following formula. Density=w/v ×3.81 where w equals the weight of a sample in grams, v equals volume in cubic inches and 3.81 is the factor used to convert grams per cubic inch into pounds per cubic foot (PCF).

Dimensional Stability, % Volume Change (ASTM D 2126)

The samples for testing measure 4 inches×4 inches×1 inch. The dimensions are measured at 1, 7, 14 and 28 days aging at 70° C. and 100% relative humidity (RH). The values are reported as percent change in volume.

Compressive Strength and Modulus (ASTM D 1621)

The samples for testing measure 2-inches×2-inches×1-inch. The samples are compressed to 10% of their measured thickness. Compressive strength is calculated by dividing the maximum load in pounds by the area of the sample in square inches. Compressive modulus is calculated by dividing the stress on the sample by the strain.

"K" Factor (ASTM C 518)

A measure of the insulation ability or thermal conductivity of the foam. The "K" factor is normally expressed as BTU-inch/hour square foot ° F.

The foam-forming formulations prepared as described in this Example can be used to prepare laminated foam board by depositing the formulation onto a lower substrate by means of a mixing head, optionally applying an upper substrate, and passing the laminate through an oven to expand and cure the foam.

What I claim and desire to protect by Letters Patent is:

1. A process for preparing a mixture of polyester polyols comprising reacting a charge comprising (a) tall oil and (b) aromatic polyester polyols, in the presence of an esterification/transesterification catalyst while continuously removing the water that is formed during the esterification reaction, the ratio of tall oil to aromatic polyester polyols being from about 0.9:1 to about 0.2:1, and the catalyst being present in an amount of at least 1.7 grams per kilogram of the total charge.

2. The process of claim 1 wherein the reaction is conducted at a temperature of from about 180° C. to about 235° C.

3. The process of claim 1 wherein the reaction is conducted at atmospheric pressure.

4. The process of claim 1 wherein the catalyst is tetraisopropyl titanate.

5. The process of claim 1 wherein the aromatic polyester polyols are the reaction product of dimethyl terephthalate process residue and diethylene glycol.

6. The process of claim 1 wherein said mixture of polyols has a hydroxyl number of 150–210 and a viscosity of 1500–18,000 cps at 25° C.

7. The process of claim 1 wherein said mixture of polyols has a hydroxyl number of 270–350 and a viscosity of 1000–3000 cps at 25° C.

8. A mixture of polyester polyols prepared by reacting a charge comprising (a) tall oil and (b) aromatic polyester polyols, in the presence of an esterification/transesterification catalyst while continuously removing the water that is formed during the esterification reaction, the ratio of tall oil to aromatic polyester polyols being from about 0.9:1 to about 0.2:1, and the catalyst being present in an amount of at least 1.7 grams per kilogram of the total charge.

9. The mixture of polyols of claim 8 wherein the reaction is conducted at a temperature of from about 180° C. to about 235° C.

10. The mixture of polyols of claim 8 wherein the reaction is conducted at atmospheric pressure.

11. The mixture of polyols of claim 8 wherein the catalyst is tetraisopropyl titanate.

12. The mixture of polyols of claim 8 wherein the aromatic polyester polyols are the reaction product of dimethyl terephthalate process residue and diethylene glycol.

13. The mixture of polyols of claim 8 wherein said mixture of polyols has a hydroxyl number of 150–210 and a viscosity of 1500–18,000 cps at 25° C.

14. The mixture of polyols of claim 8 wherein said mixture of polyols has a hydroxyl number of 270–350 and a viscosity of 1000–3000 cps at 25° C.

15. A laminate comprising at least one facing sheet adhered to a urethane-modified polyisocyanurate foam prepared by reacting a mixture comprising
 (1) an organic polyisocyanate,
 (2) a blowing agent,
 (3) a urethane catalyst,
 (4) a trimerization catalyst and
 (5) a mixture of polyester polyols prepared by reacting a charge comprising (a) tall oil and (b) aromatic polyester polyols, in the presence of an esterification/transesterification catalyst while continuously removing the water that is formed during the esterification reaction, the ratio of tall oil to aromatic polyester polyols being from about 0.9:1 to about 0.2:1, and the catalyst being present in an amount of at least 1.7 grams per kilogram of the total charge.

16. The laminate of claim 15 wherein the aromatic polyester polyols are the reaction product of dimethyl terephthalate process residue and diethylene glycol.

17. The laminate of claim 15 wherein said mixture of polyols has a hydroxyl number of 150–210 and a viscosity of 1500–18,000 cps at 25° C.

18. The laminate of claim 15 wherein said mixture of polyols has a hydroxyl number of 270–350 and a viscosity of 1000–3000 cps at 25° C.

* * * * *